United States Patent
Kuraoka et al.

(10) Patent No.: US 11,283,333 B2
(45) Date of Patent: Mar. 22, 2022

(54) COIL FORMING DEVICE

(71) Applicant: TOYOTA JIDOSHA KABUSHIKI KAISHA, Toyota (JP)

(72) Inventors: Hiromitsu Kuraoka, Okazaki (JP); Toshiaki Takahashi, Toyota (JP)

(73) Assignee: TOYOTA JTDOSHA KABUSHIKI KATSHA, Toyota (JP)

( * ) Notice: Subject to any disclaimer, the term of this patent is extended or adjusted under 35 U.S.C. 154(b) by 728 days.

(21) Appl. No.: 16/160,105

(22) Filed: Oct. 15, 2018

(65) Prior Publication Data

US 2019/0173364 A1  Jun. 6, 2019

(30) Foreign Application Priority Data

Dec. 1, 2017  (JP) .............................. JP2017-231872

(51) Int. Cl.
| | |
|---|---|
| *H02K 15/04* | (2006.01) |
| *H01F 41/061* | (2016.01) |
| *H02K 15/00* | (2006.01) |
| *H01F 5/04* | (2006.01) |
| *H01F 41/10* | (2006.01) |
| *H02K 3/04* | (2006.01) |
| *H01F 41/077* | (2016.01) |
| *H01F 41/084* | (2016.01) |

(52) U.S. Cl.
CPC ............. *H02K 15/045* (2013.01); *H01F 5/04* (2013.01); *H01F 41/061* (2016.01); *H01F 41/10* (2013.01); *H02K 3/04* (2013.01); *H02K 15/0068* (2013.01); *H02K 15/0428* (2013.01); *H01F 41/077* (2016.01); *H01F 41/084* (2016.01); *H02K 15/0414* (2013.01); *Y10T 29/49071* (2015.01); *Y10T 29/49073* (2015.01)

(58) Field of Classification Search
CPC .... H02K 15/0068; H02K 15/045; H02K 3/04; H02K 15/0414; H02K 15/0428; H01F 41/061; H01F 41/077; H01F 41/084; H01F 5/04; H01F 41/10; Y10T 29/49071; Y10T 29/49073
See application file for complete search history.

(56) References Cited

U.S. PATENT DOCUMENTS

| | | | |
|---|---|---|---|
| 2015/0059174 A1* | 3/2015 | Shigematsu | ....... H02K 15/0428 29/872 |
| 2015/0171716 A1 | 6/2015 | Kurashige et al. | |
| 2016/0294263 A1 | 10/2016 | Hashimoto et al. | |

FOREIGN PATENT DOCUMENTS

| | | | |
|---|---|---|---|
| JP | 2009240018 A | * | 10/2009 |
| JP | 2017-093197 A | | 5/2017 |
| JP | 2018-068046 A | | 4/2018 |
| WO | 2015/083827 A1 | | 6/2015 |

* cited by examiner

*Primary Examiner* — A. Dexter Tugbang
(74) *Attorney, Agent, or Firm* — Sughrue Mion, PLLC

(57) ABSTRACT

In a coil forming device, an edge line in an escape region is formed so that a clearance between the edge line in the escape region and a recess portion in an axis direction is larger than a minimum clearance between the edge line in an inclined region and the recess portion in the axis direction. When a second die is rotated relative to a first die in the clockwise direction the flat-square conductive material end is bent in flatwise bending by the recess portion and the inclined region of a protrusion portion, and then, the flat-square conductive material end reaches the escape region.

5 Claims, 17 Drawing Sheets

COIL FORMING DEVICE

INCORPORATION BY REFERENCE

The disclosure of Japanese Patent Application No. 2017-231872 filed on Dec. 1, 2017 including the specification, drawings and abstract is incorporated herein by reference in its entirety.

BACKGROUND

1. Technical Field

The disclosure relates to a coil forming device.

2. Description of Related Art

Japanese Unexamined Patent Application Publication No. 2017-093197 (JP 2017-093197 A) describes a coil forming device configured to perform flatwise bending (FW bending) on a winding end as an end of a winding wire constituting a coil. More specifically, the winding end extending linearly is placed between an upper die and a lower die, and the upper die is rotationally moved relative to the lower die. A machining surface of the upper die and a machining surface of the lower die are configured to approach each other along with the rotational movement of the upper die. Accordingly, when the upper die is rotationally moved relative to the lower die, the winding end fits the machining surface of the upper die and the machining surface of the lower die, and hereby, the winding end is bent in FW bending. Further, after the FW bending is finished, the upper die is rotationally moved in a reverse direction so that the upper die is separated from the lower die, and then, a coil is taken out of the coil forming device.

SUMMARY

However, the configuration of JP 2017-093197 A has a problem in terms of positional accuracy of the winding end. The reason is as follows. When the upper die is rotationally moved in the reverse direction after the FW bending, the winding end may be pulled by the upper die due to contact friction between the upper die and the winding end, so that the winding end may deform.

The disclosure provides a technique to improve positional accuracy of an end of a flat-square conductive material constituting a coil in a coil forming device configured to perform flatwise bending on the end of the flat-square conductive material.

An aspect of the disclosure relates to a coil forming device configured to perform flatwise bending on a flat-square conductive material end as an end of a flat-square conductive material constituting a coil. The coil forming device includes a first die and a second die configured to independently rotate around a first rotation axis. The first die includes a first machining surface. The second die includes a second machining surface. The first machining surface and the second machining surface are placed so as to face each other across the flat-square conductive material end in the axis direction of the first rotation axis. The first machining surface includes a recess portion recessed so as to be distanced from the second machining surface in a state where the first machining surface and the second machining surface face each other. The second machining surface includes a protrusion portion protruding in a projection shape toward the recess portion in the state where the first machining surface and the second machining surface face each other. An edge line of the protrusion portion extends in an arc shape around the first rotation axis. The protrusion portion includes an inclined region and an escape region adjacent to each other in a rotation direction of the second die. The inclined region and the escape region are placed such that, when the second die is rotated relative to the first die in a first rotation direction, the inclined region first faces the recess portion in the axis direction, and then, the escape region faces the recess portion in the axis direction. The edge line in the inclined region is inclined so that a clearance between the edge line in the inclined region and the recess portion in the axis direction is gradually decreased as the second die is rotated relative to the first die in the first rotation direction. The edge line in the escape region is formed so that a clearance between the edge line in the escape region and the recess portion in the axis direction is larger than a minimum clearance between the edge line in the inclined region and the recess portion in the axis direction. When the second die is rotated relative to the first die in the first rotation direction in a state where the flat-square conductive material end is placed between the first machining surface and the second machining surface so that two flat surfaces of the flat-square conductive material end face the first machining surface and the second machining surface, respectively, the flat-square conductive material end is bent in flatwise bending by the recess portion and the inclined region of the protrusion portion, and then, the flat-square conductive material end reaches the escape region. With the above configuration, when the flat-square conductive material end moves over the inclined region and reaches the escape region, a contact resistance between the flat-square conductive material end and the first machining surface is slightly decreased. Accordingly, in order to take the coil out of the coil forming device, when the first die is rotated relative to the second die in the first rotation direction in the state where the flat-square conductive material end has reached the escape region, the flat-square conductive material end can be hardly pulled by the first die in the first rotation direction. Thus, high positional accuracy of the flat-square conductive material end is achieved. A width of the escape region may be larger than a width of the flat-square conductive material end. With the above configuration, when the flat-square conductive material end moves over the inclined region and reaches the escape region, the contact resistance between the flat-square conductive material end and the first machining surface is surely decreased. The first die may include a first restriction surface configured to restrict the flat-square conductive material end from moving relative to the first die in the first rotation direction, such that the first restriction surface makes contact with a first edge surface of the flat-square conductive material end in the state where the flat-square conductive material end is placed between the first machining surface and the second machining surface so that the two flat surfaces of the flat-square conductive material end face the first machining surface and the second machining surface, respectively. With the above configuration, when the second die is rotated relative to the first die in the first rotation direction so that the flat-square conductive material end is bent in flatwise bending, it is possible to restrain the flat-square conductive material end from deforming by being pulled by the second die in the first rotation direction. The second die may include a second restriction surface configured to come into contact with a second edge surface, of the flat-square conductive material end, on the opposite side from the first edge surface when the flat-square conductive material end moves over the inclined region and reaches the escape region. With the above configuration, when a base of the flat-square conductive material end is bent in edgewise bending by simultaneously rotating the first die and the second die in a second rotation direction reverse to the first rotation direction in the state where the flat-square conductive material end is sandwiched between the first machining surface and the second machining surface, edgewise bending is performed in the state where the flat-square conductive material end is sandwiched between the first restriction surface and the second restriction surface, thereby making it possible to restrain unintentional deformation of the flat-square conductive material end. A difference between the clearance between the edge line in the escape region and the recess portion in the axis direction and the minimum clearance between the edge line in the inclined region and the recess portion in the axis direction may be from 0.05 mm to 0.1 mm. With the above configuration, it is possible to effectively restrain the contact resistance and to secure the positional accuracy of the flat-square conductive material end in the axis direction at the same time.

In the disclosure, when the flat-square conductive material end moves over the inclined region and reaches the escape region, the contact resistance between the flat-square conductive material end and the first machining surface is slightly decreased. Accordingly, in order to take the coil out of the coil forming device, when the first die is rotated relative to the second die in the first rotation direction in the state where the flat-square conductive material end has reached the escape region, the flat-square conductive material end can be hardly pulled by the first die in the first rotation direction. Thus, high positional accuracy of the flat-square conductive material end is achieved.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

The following describes an embodiment of the disclosure with reference to the drawings.

Figure 1:
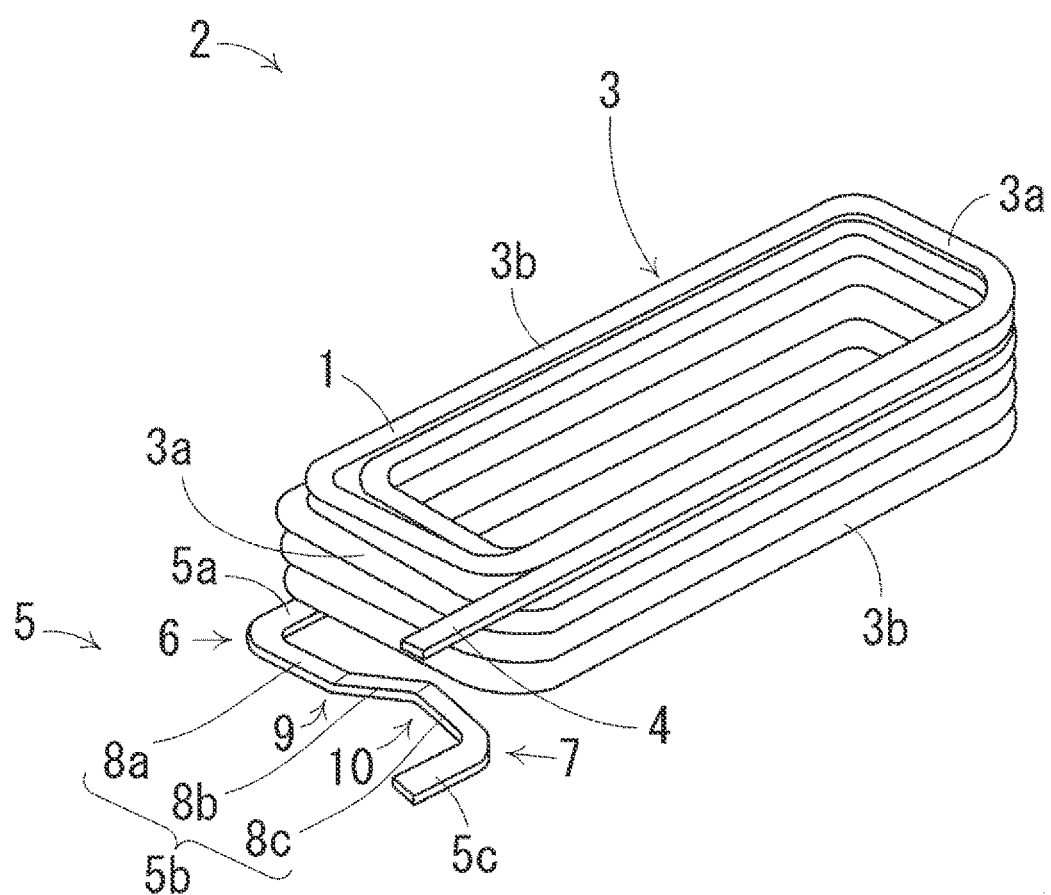
FIG. 1 is a perspective view of a coil constituted by a flat-square conductive material.
Figure 2:
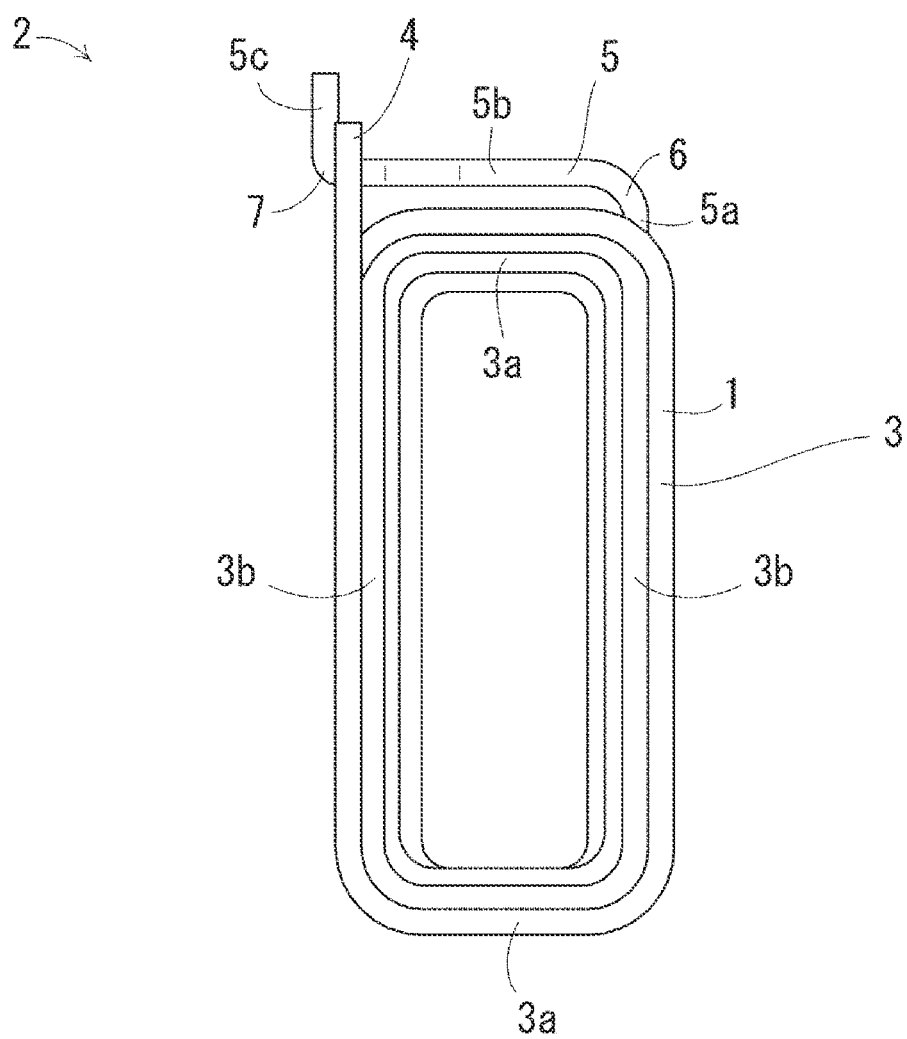
FIG. 2 is a plan view of the coil.

With reference to FIGS. 1 and 2, a coil formed by a coil forming device of the present embodiment will be described first.

FIG. 1 is a perspective view of a coil 2 constituted by a flat-square conductive material 1. FIG. 2 is a plan view of the coil 2. As illustrated in FIGS. 1 and 2, the coil 2 is configured such that the flat-square conductive material 1 is bent in flatwise bending so as to be formed into a rectangular shape. The coil 2 includes a coil body 3, a linear bus bar 4, and a Z-shaped bus bar 5 (a flat-square conductive material end).

The coil body 3 is a part where the flat-square conductive material 1 is wound in a rectangular shape. The coil body 3 includes two short side portions 3a and two long side portions 3b. The two short side portions 3a are parts corresponding to short sides of the coil body 3. The two long side portions 3b are parts corresponding to long sides of the coil body 3.

The linear bus bar 4 and the Z-shaped bus bar 5 correspond to two ends of the flat-square conductive material 1. The linear bus bar 4 and the Z-shaped bus bar 5 are placed across a first one of the short side portions 3a on the opposite side from a second one of the short side portions 3a.

As illustrated in FIG. 1, the linear bus bar 4 is a part linearly extending from an upper end of the coil body 3 so as to be parallel to the long side portions 3b.

The Z-shaped bus bar 5 is a part extending in a Z-shape from a bottom end of the coil body 3. The Z-shaped bus bar 5 includes a base portion 5a, a flexural extension portion 5b, and a distal end 5c.

As illustrated in FIG. 2, the base portion 5a is a part linearly extending from a bottom end of the coil body 3 so as to be parallel to the long side portions 3b in a plan view.

The flexural extension portion 5b is a part linearly extending from a distal end of the base portion 5a so as to be parallel to the short side portions 3a in a plan view. The base portion 5a and the flexural extension portion 5b are connected to each other via a base-side edgewise bending portion 6. The base-side edgewise bending portion 6 is a part obtained by bending the Z-shaped bus bar 5 in edgewise bending by 90 degrees in the counterclockwise direction in a plan view.

The distal end 5c is a part linearly extending from a distal end of the flexural extension portion 5b so as to be parallel to the long side portions 3b in a plan view. The distal end 5c and the flexural extension portion 5b are connected to each other via a distal-side edgewise bending portion 7. The distal-side edgewise bending portion 7 is a part obtained by bending the Z-shaped bus bar 5 in edgewise bending by 90 degrees in the clockwise direction in a plan view.

As illustrated in FIG. 2, the flexural extension portion 5b faces the short side portion 3a of the coil body 3 in the longitudinal direction of the long side portions 3b in a plan view. Further, the distal end 5c is placed in the vicinity of the linear bus bar 4 in a plan view.

As illustrated in FIG. 1, the flexural extension portion 5b includes a horizontal extension portion 8a, an upward inclined region 8b, and a downward inclined region 8c. The horizontal extension portion 8a, the upward inclined region 8b, and the downward inclined region 8c are continuous in this order from the base-side edgewise bending portion 6 toward the distal-side edgewise bending portion 7.

The horizontal extension portion 8a is a part extending horizontally. The upward inclined region 8b is a part inclined upward toward the distal-side edgewise bending portion 7. The downward inclined region 8c is a part inclined downward toward the distal-side edgewise bending portion 7. The horizontal extension portion 8a and the upward inclined region 8b are connected to each other via a base-side flatwise bending portion 9. The base-side flatwise bending portion 9 is a part obtained by bending the flexural extension portion 5b in flatwise bending so that the flexural extension portion 5b projects downward. The upward inclined region 8b and the downward inclined region 8c are connected to each other via a distal-side flatwise bending portion 10. The distal-side flatwise bending portion 10 is a part obtained by bending the flexural extension portion 5b in flatwise bending so that the flexural extension portion 5b projects upward.

The linear bus bar 4 is welded to the distal end 5c of the Z-shaped bus bar 5 of another coil 2. Similarly, the distal end 5c of the Z-shaped bus bar 5 is welded to the linear bus bar 4 of another coil 2. When the coils 2 are electrically connected to each other by welding as such, a stator winding constituting an electric motor such as a three-phase alternating current motor is formed.

Figure 3:
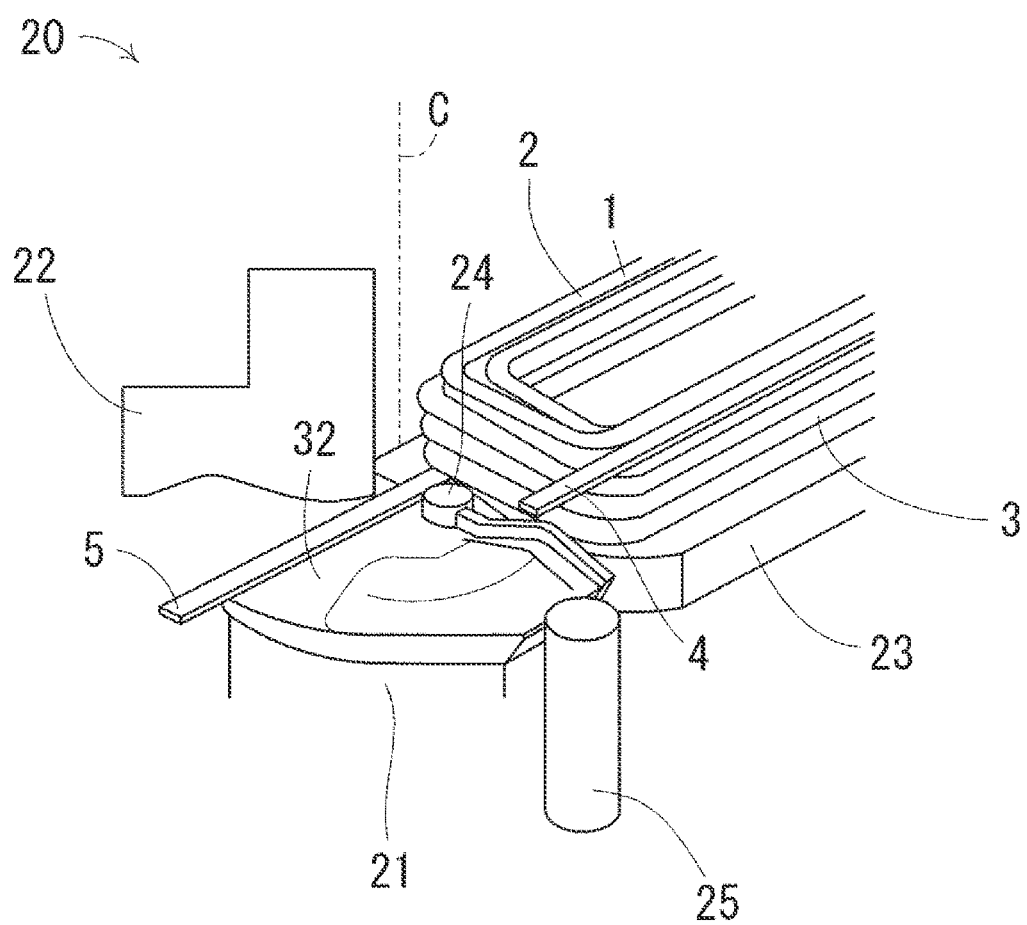
FIG. 3 is a perspective view of a coil forming device.
Figure 4:
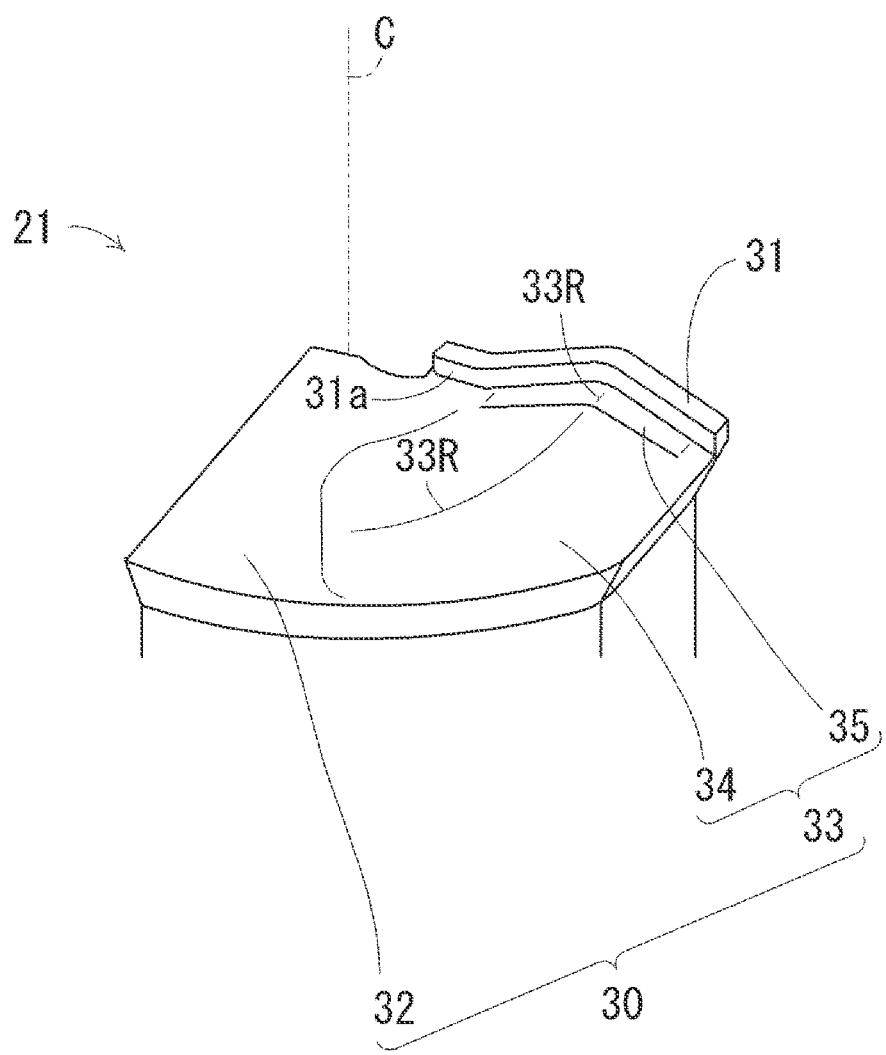
FIG. 4 is a perspective view of a lower die.
Figure 5:
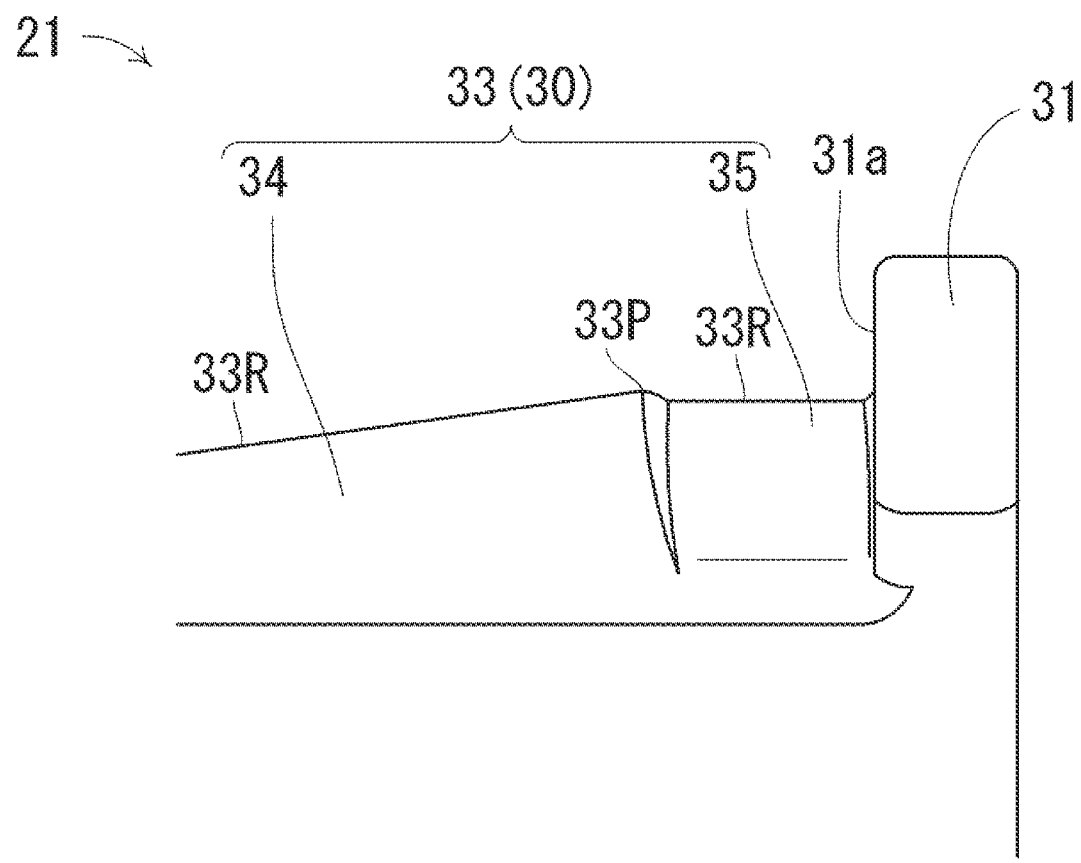
FIG. 5 is a side view of the lower die.
Figure 6:
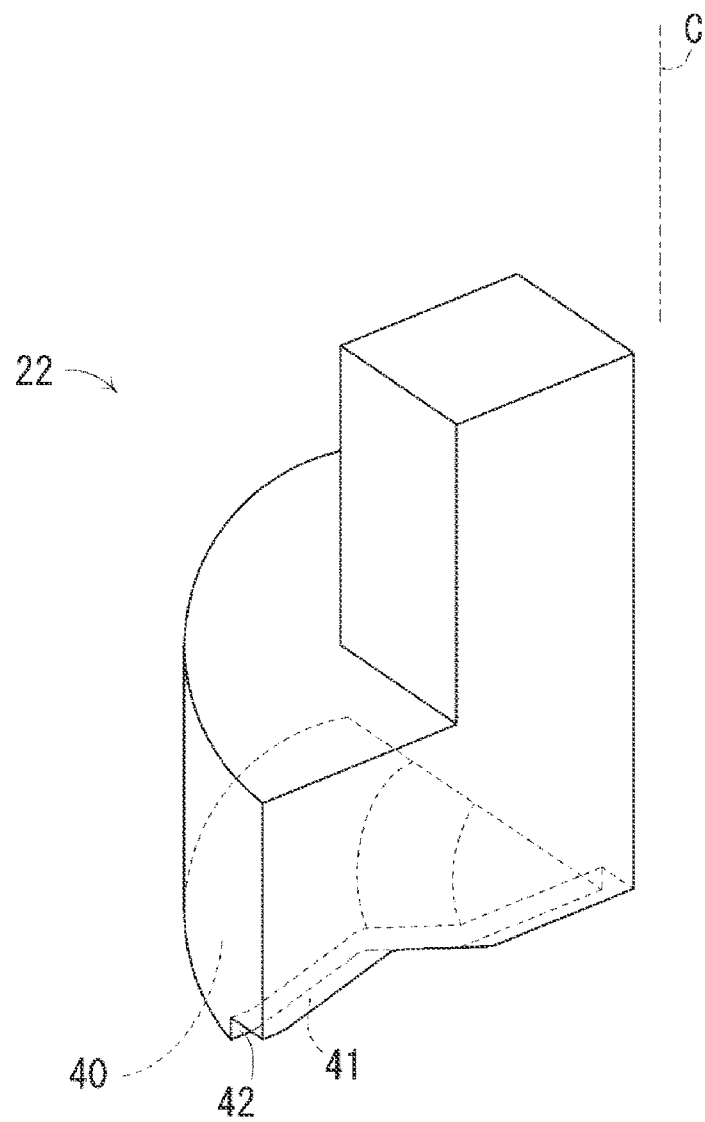
FIG. 6 is a perspective view of an upper die.
Figure 7:
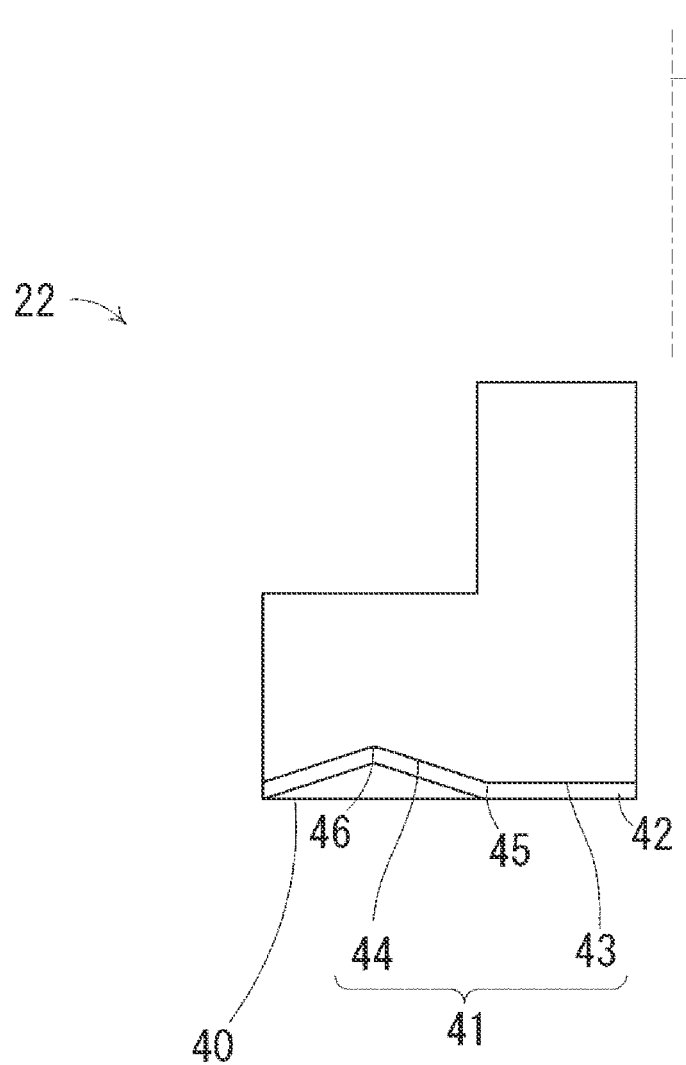
FIG. 7 is a side view of the upper die.
Figure 8:
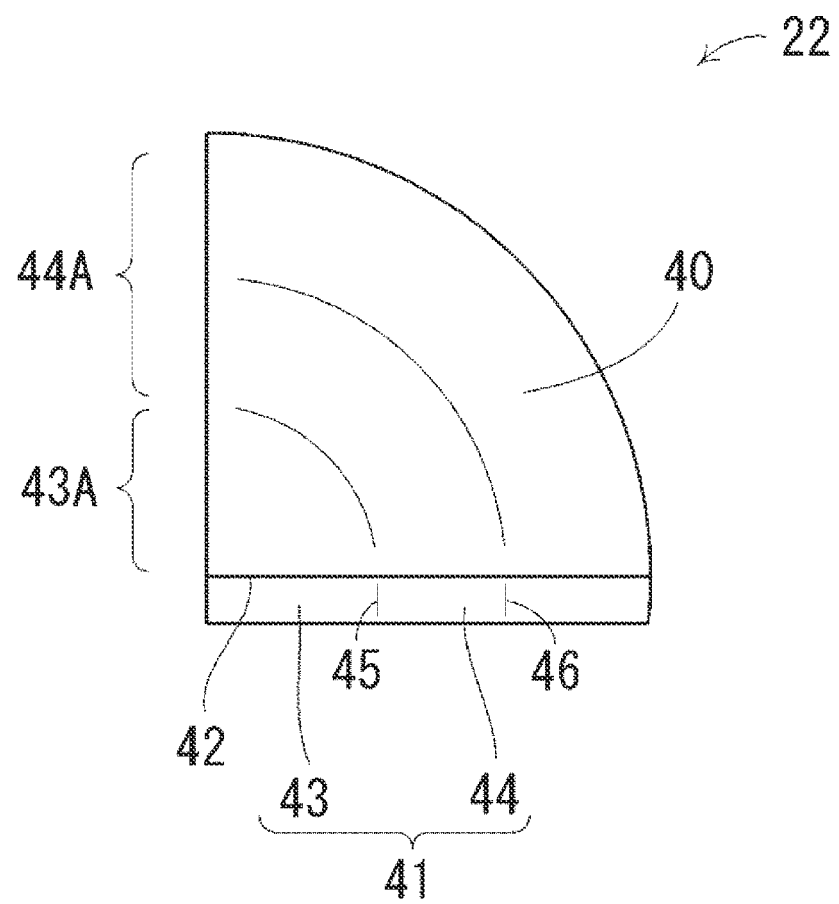
FIG. 8 is a bottom view of the upper die.

Next will be described the coil forming device 20 with reference to FIGS. 3 to 8. FIG. 3 is a perspective view of the coil forming device 20. FIG. 4 is a perspective view of a lower die 21 (a second die). FIG. 5 is a side view of the lower die 21. FIG. 6 is a perspective view of an upper die 22 (a first die). FIG. 7 is a side view of the upper die 22. FIG. 8 is a bottom view of the upper die 22.

As illustrated in FIG. 3, the coil forming device 20 mainly includes a main body holding portion 23 configured to hold the coil body 3 of the coil 2, the upper die 22, the lower die 21, a base guide portion 24, and a distal guide portion 25. The Z-shaped bus bar 5 of the coil 2 as illustrated in FIG. 1 is formed in collaboration with the main body holding portion 23, the upper die 22, the lower die 21, the base guide portion 24, and the distal guide portion 25. The upper die 22 and the lower die 21 mainly form the base-side flatwise bending portion 9 and the distal-side flatwise bending portion 10 of the Z-shaped bus bar 5. The base guide portion 24 mainly forms the base-side edgewise bending portion 6 of the Z-shaped bus bar 5. The distal guide portion 25 mainly forms the distal-side edgewise bending portion 7 of the Z-shaped bus bar 5.

As illustrated in FIG. 3, the coil 2 is held by the main body holding portion 23 so that a winding direction of the flat-square conductive material 1 constituting the coil body 3 is horizontal. That is, the coil 2 is held by the main body holding portion 23 so that flat surfaces of the flat-square conductive material 1 constituting the coil body 3 are substantially horizontal.

Further, the lower die 21 and the upper die 22 have a common rotation axis C extending in the vertical direction. The lower die 21 and the upper die 22 are held rotatably around the rotation axis C and are configured to be rotationally driven by a drive mechanism (not shown). In the meantime, movements of the lower die 21 and the upper die 22 in the vertical direction are prohibited. Hereby, the drive mechanism for the lower die 21 and the upper die 22 is configured in an extremely simple manner, and this contributes to a stable operation of the drive mechanism with less failure.

In the following description, a "clockwise direction (a first rotation direction)" indicates a rotation direction based on the rotation axis C in FIG. 3 and is a clockwise direction in a plan view. Similarly, a "counterclockwise direction (a second rotation direction)" indicates a rotation direction based on the rotation axis C in FIG. 3 and is a counterclockwise direction in a plan view.

Further, "upper side (upward)," "upper end," "lower side (downward)," and "bottom end" should be interpreted based on the perspective view of FIG. 3. Note that the coil forming device 20 can be also used in such a state where the coil forming device 20 is set upside down. In the present embodiment, as illustrated in FIG. 3, the lower die 21 is placed below the upper die 22.

Further, as illustrated in FIG. 1, the Z-shaped bus bar 5 includes the base-side edgewise bending portion 6, the distal-side edgewise bending portion 7, the base-side flatwise bending portion 9, and the distal-side flatwise bending portion 10. In this regard, the Z-shaped bus bar 5 in the stage before the base-side edgewise bending portion 6, the distal-side edgewise bending portion 7, and the base-side flatwise bending portion 9, and the distal-side flatwise bending portion 10 are all formed is hereinafter just referred to as the bus bar 5 for convenience of the description.

Next will be described the lower die 21 with reference to FIGS. 4 and 5.

As described above, the lower die 21 is configured to be rotatable around the rotation axis C. In a plan view, the lower die 21 is formed in a fan shape having an arc angle of around 90 degrees around the rotation axis C. The lower die 21 includes a lower-die machining surface 30 (a second machining surface) facing upward, and a rib 31. The rib 31 is placed in a distal end of the lower-die machining surface 30 in the counterclockwise direction.

A flat portion 32 and a protrusion portion 33 are formed on the lower-die machining surface 30 sequentially in the counterclockwise direction. The flat portion 32 is formed in a planar shape perpendicular to the rotation axis C. The protrusion portion 33 is a part protruding upward in a projection shape.

The protrusion portion 33 is formed so as to extend in an arc shape around the rotation axis C. More specifically, an edge line 33R of the protrusion portion 33 extends in an arc shape around the rotation axis C. The protrusion portion 33 is inclined downward toward the rotation axis C on a side radially inward of the edge line 33R. In the meantime, the protrusion portion 33 is inclined downward as it is distanced from the rotation axis C, on a side radially outward of the edge line 33R. The protrusion portion 33 includes an inclined region 34 and an escape region 35 adjacent to each other in the rotation direction of the lower die 21.

As illustrated in FIG. 5, the inclined region 34 is a part inclined so as to protrude more as it advances in the counterclockwise direction. More specifically, the edge line 33R is gradually inclined upward toward the rib 31 in the inclined region 34.

The escape region 35 is a part slightly recessed downward. As illustrated in FIG. 4, the escape region 35 is formed so as to extend along the radial direction. The escape region 35 extends along the longitudinal direction of the rib 31. The escape region 35 extends so as to be perpendicular to the edge line 33R in a plan view. In this embodiment, the escape region 35 is a groove extends along the longitudinal direction of the rib 31.

Accordingly, as illustrated in FIG. 5, the edge line 33R of the protrusion portion 33 is formed such that the edge line 33R is gradually inclined upward in the inclined region 34 as it advances in the counterclockwise direction, and when the edge line 33R reaches the escape region 35, the edge line 33R slightly drops. The edge line 33R extends horizontally in the escape region 35. In the escape region 35, the edge line 33R is positioned below a vertex 33P of the edge line 33R in the inclined region 34. The vertex 33P corresponds to a distal end, in the counterclockwise direction, of the edge line 33R in the inclined region 34.

As illustrated in FIG. 5, the rib 31 includes a lower-die restriction surface 31a (a second restriction surface) facing the clockwise direction. As illustrated in FIG. 4, the rib 31 extends along the radial direction. Further, the lower-die restriction surface 31a of the rib 31 extends along the radial direction.

Next will be described the upper die 22 with reference to FIGS. 6 to 8.

As described above, the upper die 22 is configured to be rotatable around the rotation axis C. In a plan view, the upper die 22 is formed in a fan shape having an arc angle of around 90 degrees around the rotation axis C.

The upper die 22 has a bottom face 40 facing downward. An upper-die machining surface 41 and an upper-die restriction surface 42 are formed on the bottom face 40.

As illustrated in FIGS. 6 and 8, the upper-die machining surface 41 and the upper-die restriction surface 42 are formed in a distal end of the bottom face 40 in the counterclockwise direction. As illustrated in FIGS. 6 to 8, the upper-die machining surface 41 and the upper-die restriction surface 42 are formed so as to extend along the radial direction.

As illustrated in FIG. 7, the upper-die machining surface 41 is formed so as to face downward. The upper-die machining surface 41 includes a flat portion 43 and a recess portion (recess) 44. The recess portion 44 is placed radially outward of the flat portion 43.

The flat portion 43 is formed in a planar shape perpendicular to the vertical direction.

The recess portion 44 is formed in a generally reverse V-shape so as to be recessed upward. The shape of the recess portion 44 in a side view has a similar figure to a sectional shape of the protrusion portion 33 illustrated in FIG. 4.

The upper-die machining surface 41 includes a bending portion 45 that bends so that a boundary between the flat portion 43 and the recess portion 44 projects downward. Further, the recess portion 44 includes a bending portion 46 that bends so as to project upward in the center of the recess portion 44 in the radial direction.

As illustrated in FIG. 8, the upper-die restriction surface 42 is formed in a planar shape so as to be perpendicular to the rotation direction of the upper die 22.

Further, the bottom face 40 includes an arc flat portion 43A extending arcuately, and an arc recess portion 44A extending arcuately. The arc flat portion 43A corresponds to the flat portion 43 and is formed in a planar shape perpendicular to the vertical direction. The arc flat portion 43A is placed on a clockwise side when it is viewed from the flat portion 43. The arc recess portion 44A corresponds to the recess portion 44 and is formed in a generally reverse V-shape so as to be recessed upward. The arc recess portion 44A is placed on the clockwise side when it is viewed from the flat portion 43.

Next will be described the operation of the coil forming device 20 with reference to FIG. 3 and FIGS. 9 to 17.

First, as illustrated in FIG. 3, the coil body 3 of the coil 2 is held by the main body holding portion 23. At this time, the bus bar 5 of the coil 2 is put on the flat portion 32 of the lower die 21. That is, a flat surface, on the lower side, of the bus bar 5 of the coil 2 makes surface contact with the flat portion 32. Further, the upper die 22 is placed on the clockwise side from the bus bar 5.

Figure 9:
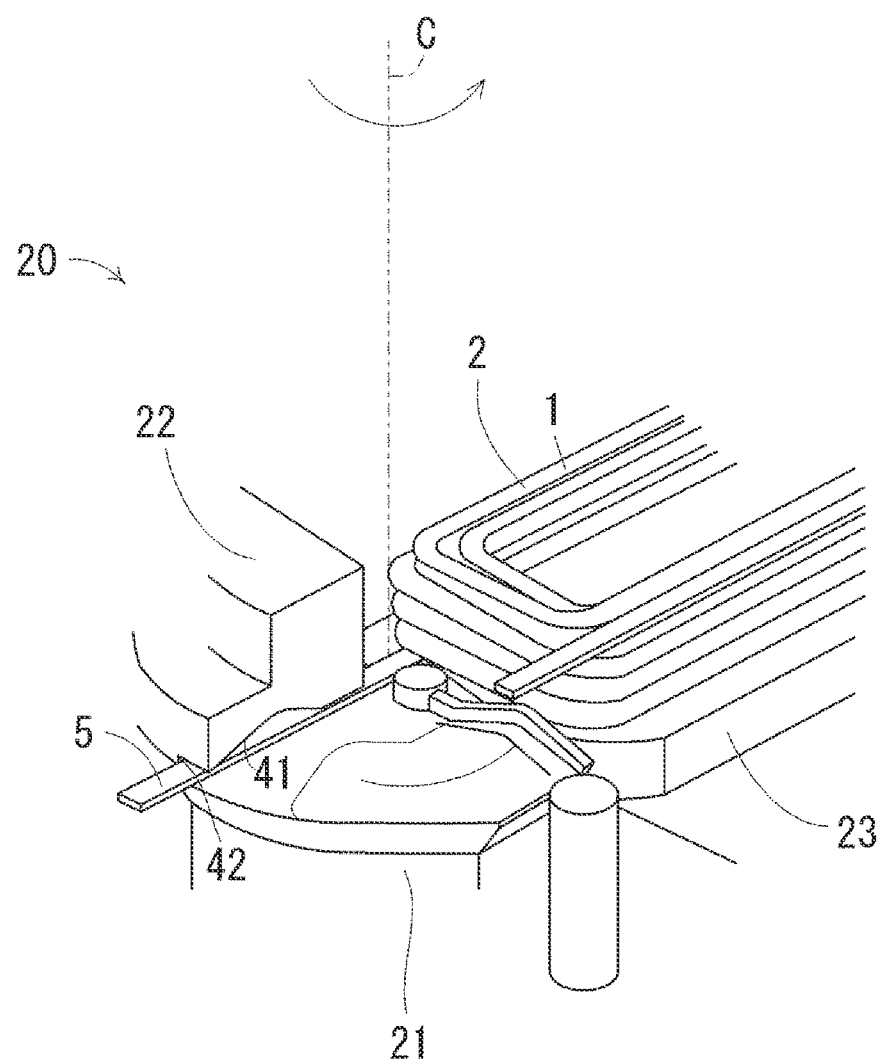
FIG. 9 is a perspective view of the coil forming device.

Then, as illustrated in FIG. 9, the upper die 22 is rotated in the counterclockwise direction, so that the upper-die machining surface 41 of the upper die 22 faces a flat surface, on the upper side, of the bus bar 5 and the upper-die restriction surface 42 of the upper die 22 makes surface contact with an edge surface, on the clockwise side, of the bus bar 5.

Figure 10:
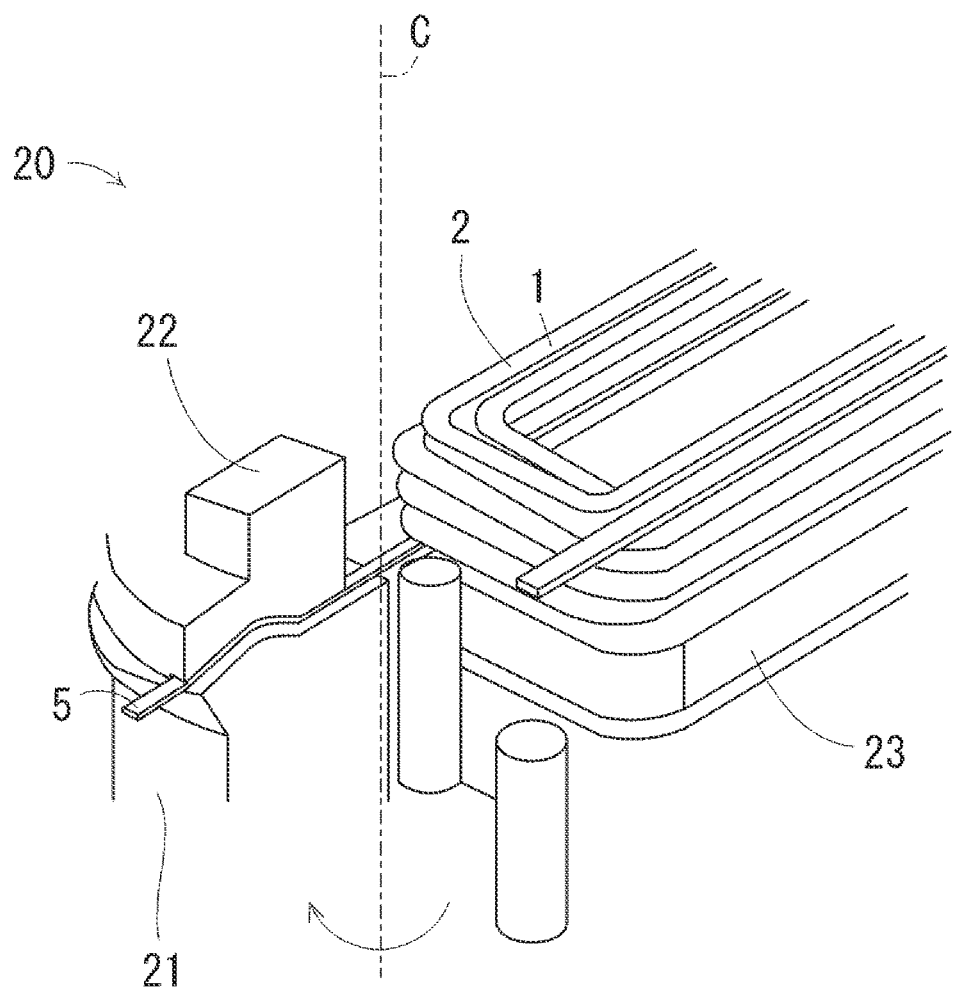
FIG. 10 is a perspective view of the coil forming device.

Then, as illustrated in FIG. 10, the lower die 21 is rotated relative to the upper die 22 by 90 degrees in the clockwise direction while the upper die 22 is fixed in position. Hereby, the base-side flatwise bending portion 9 and the distal-side flatwise bending portion 10 of the Z-shaped bus bar 5 illustrated in FIG. 1 are formed.

Figure 11:
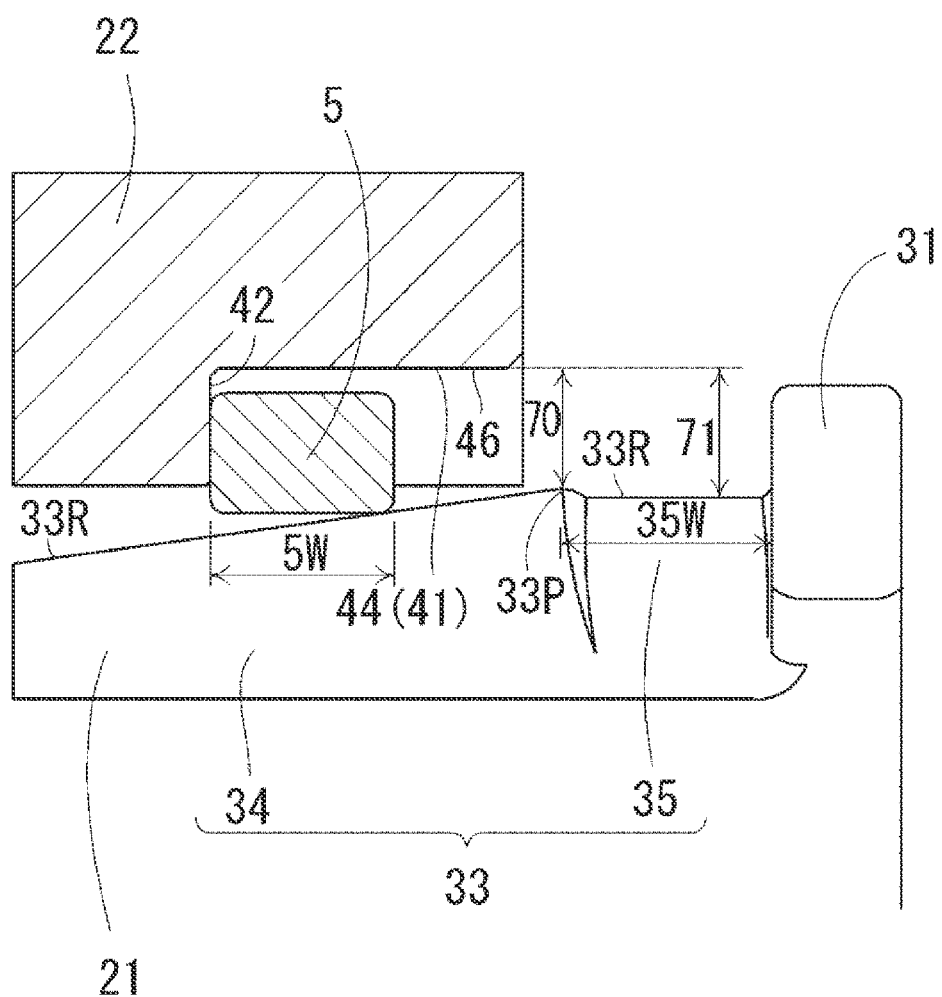
FIG. 11 is a side view of a section of a part of the coil forming device.
Figure 12:
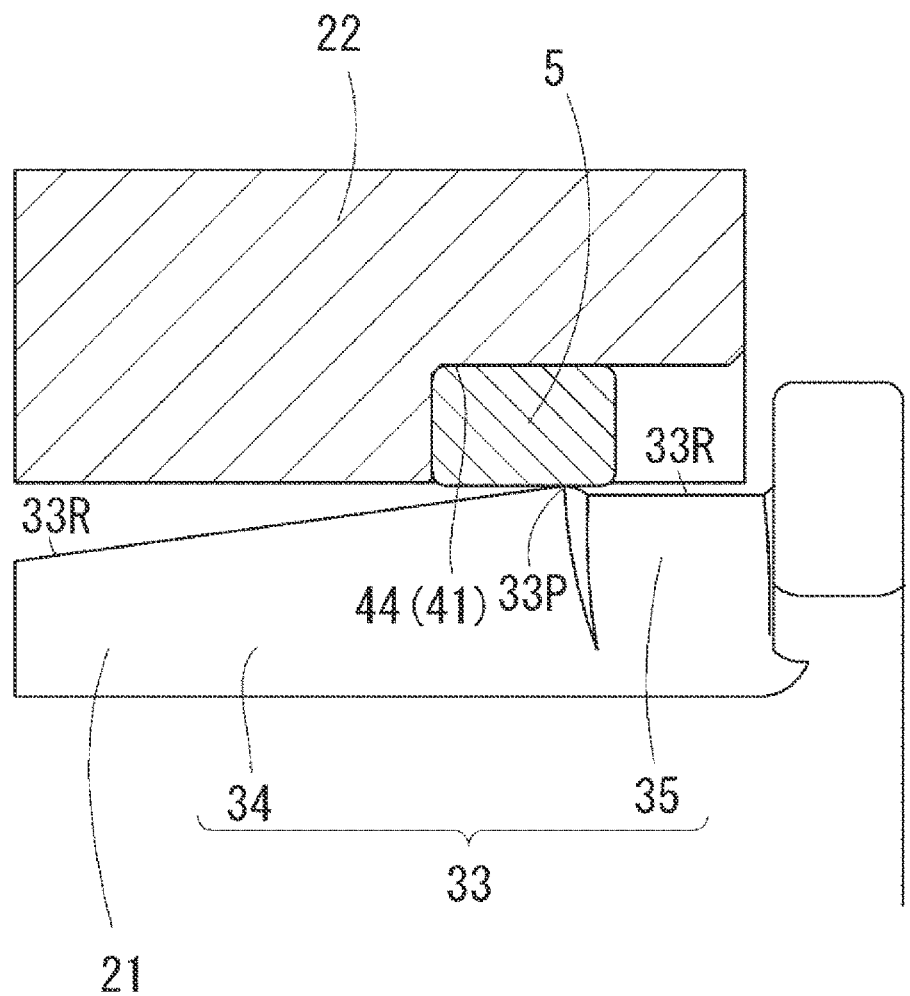
FIG. 12 is a side view of a section of a part of the coil forming device.

More specifically, as the lower die 21 is rotated in the clockwise direction, the edge line 33R in the inclined region 34 approaches the bending portion 46 of the recess portion 44, as illustrated in FIGS. 11 and 12. As such, when the edge line 33R in the inclined region 34 approaches the bending portion 46 of the recess portion 44, the bus bar 5 sandwiched between the inclined region 34 and the recess portion 44 in the vertical direction gradually fits the shapes of the inclined region 34 and the recess portion 44 and deforms into a shape following the reverse V-shape of the recess portion 44. More specifically, when the bus bar 5 deforms to bend along the bending portion 45 of the upper-die machining surface 41 illustrated in FIG. 7, the base-side flatwise bending portion 9 is formed in the bus bar 5. Similarly, when the bus bar 5 deforms to bend along the bending portion 46 of the upper-die machining surface 41 illustrated in FIG. 7, the distal-side flatwise bending portion 10 is formed in the bus bar 5.

Figure 13:
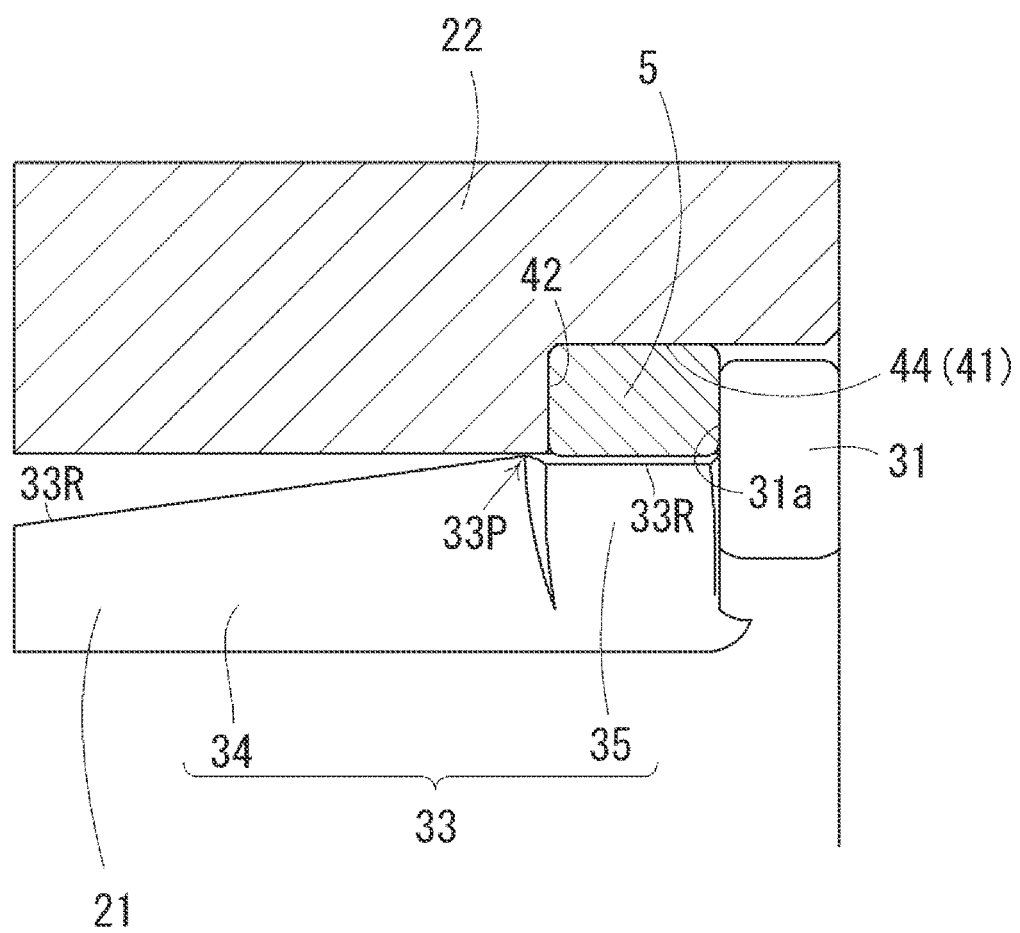
FIG. 13 is a side view of a section of a part of the coil forming device.

As illustrated in FIGS. 12 and 13, when the bus bar 5 moves over the vertex 33P of the edge line 33R in the inclined region 34, the bus bar 5 reaches the escape region 35 of the lower die 21. In the state of FIG. 13, two edge surfaces of the bus bar 5 make surface contact with the upper-die restriction surface 42 of the upper die 22 and the lower-die restriction surface 31a of the rib 31 of the lower die 21, respectively, in the horizontal direction. Accordingly, in the state of FIG. 13, the bus bar 5 is held in a compressed state between the upper-die restriction surface 42 of the upper die 22 and the lower-die restriction surface 31a of the rib 31 of the lower die 21 in the horizontal direction. Further, in the state of FIG. 13, two flat surfaces of the bus bar 5 are placed between the recess portion 44 of the upper die 22 and the escape region 35 of the lower die 21 with a small clearance in the vertical direction. As described above, the edge line 33R in the escape region 35 is positioned below the vertex 33P of the edge line 33R in the inclined region 34, so that the contact pressure between the bus bar 5 and the recess portion 44 is maximum at the time when the bus bar 5 passes over the vertex 33P, and the contact pressure is then slightly decreased when the bus bar 5 reaches the escape region 35.

Note that, as illustrated in FIG. 11, a width 35W of the escape region 35 is larger than a width 5W, of the bus bar 5, defined by a distance between two edge surfaces of the bus bar 5. Further, in the vertical direction, a distance 70 between the vertex 33P of the edge line 33R in the inclined region 34 and the recess portion 44 is smaller than a distance 71 between the edge line 33R in the escape region 35 and the recess portion 44.

Figure 14:
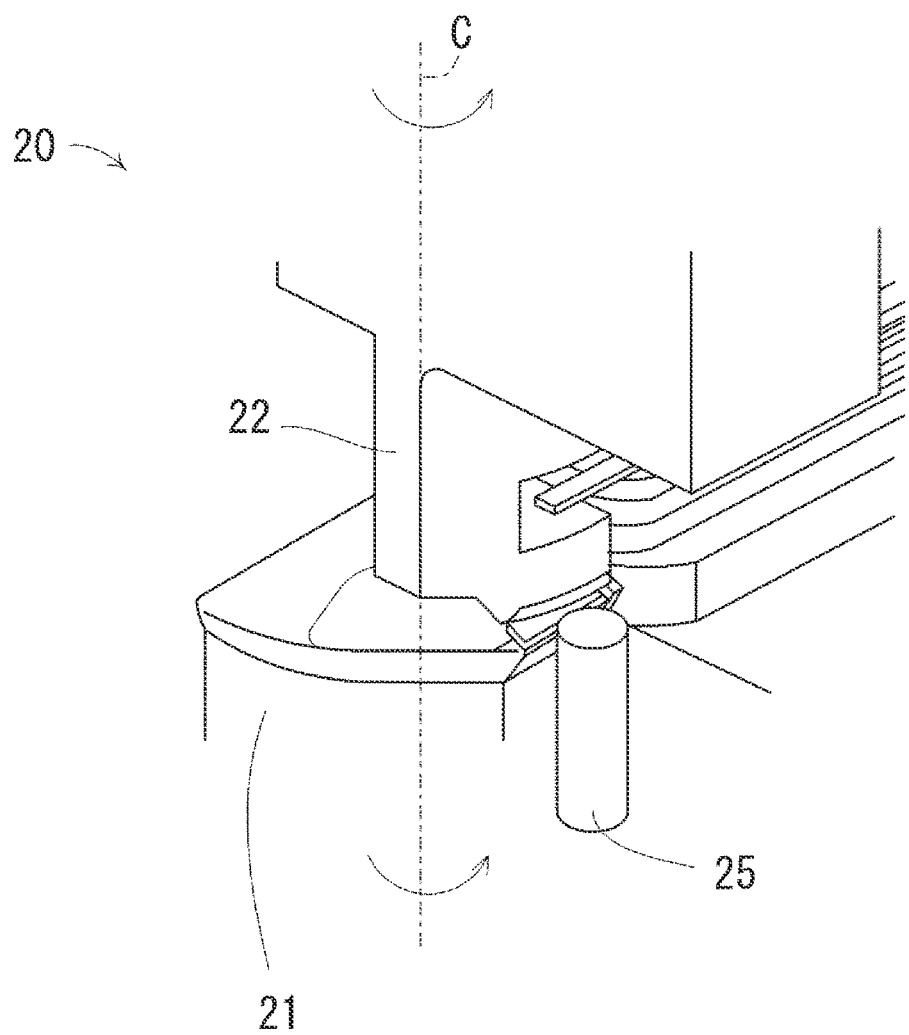
FIG. 14 is a perspective view of the coil forming device.

Then, as illustrated in FIG. 14, the lower die 21 and the upper die 22 are rotated by 90 degrees in the counterclockwise direction while the bus bar 5 is held by the lower die 21 and the upper die 22. As a result, the bus bar 5 is bent in edgewise bending by 90 degrees along an outer peripheral surface of the base guide portion 24 illustrated in FIG. 1, so that the base-side edgewise bending portion 6 of the Z-shaped bus bar 5 is formed. Similarly, when the bus bar 5 interferes with the distal guide portion 25 illustrated in FIG. 14, the distal end of the bus bar 5 is bent in edgewise bending by 90 degrees in the clockwise direction, so that the distal-side edgewise bending portion 7 of the Z-shaped bus bar 5 is formed. Hereby, the Z-shaped bus bar 5 is completed.

Figure 15:
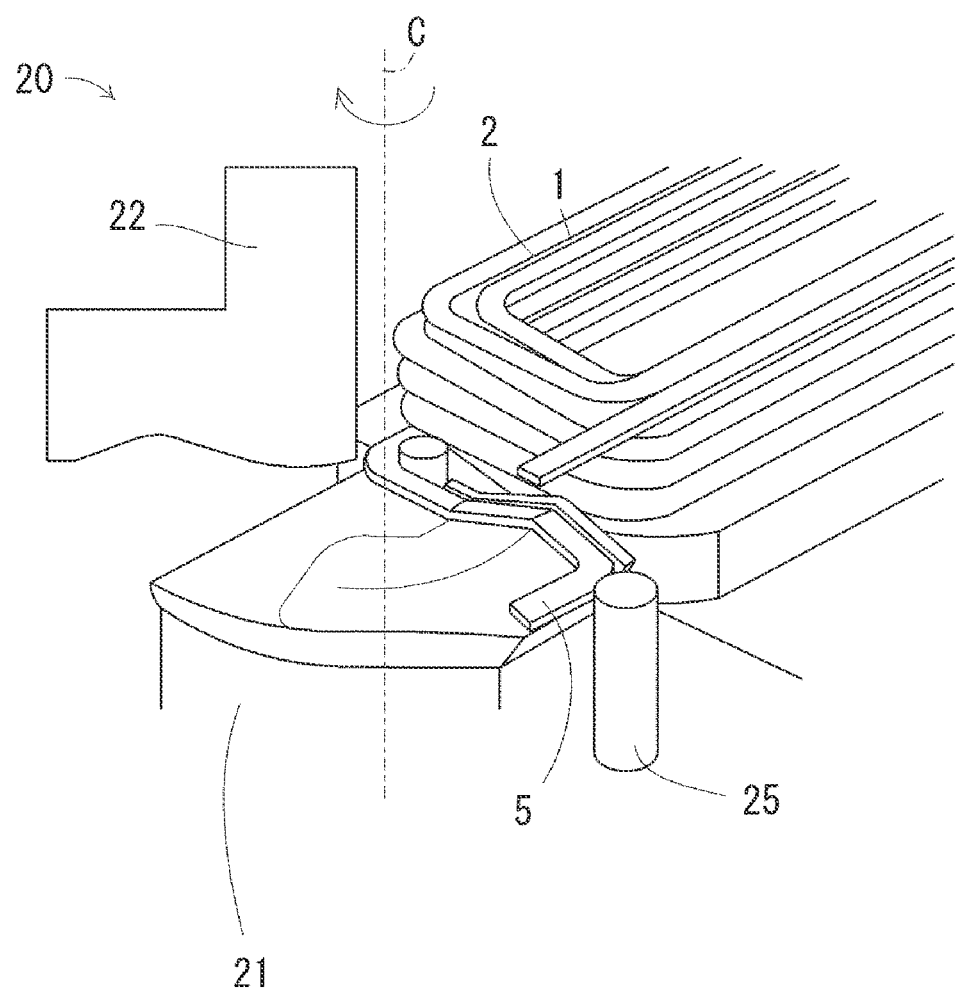
FIG. 15 is a perspective view of the coil forming device.

Then, in order to take the coil 2 out of the coil forming device 20, the upper die 22 is rotated by 135 degrees in the clockwise direction, as illustrated in FIG. 15. Hereby, the coil 2 can be drawn up from the coil forming device 20. The coil 2 is drawn up from the coil forming device 20, so that the coil 2 is taken out of the coil forming device 20.

Figure 16:
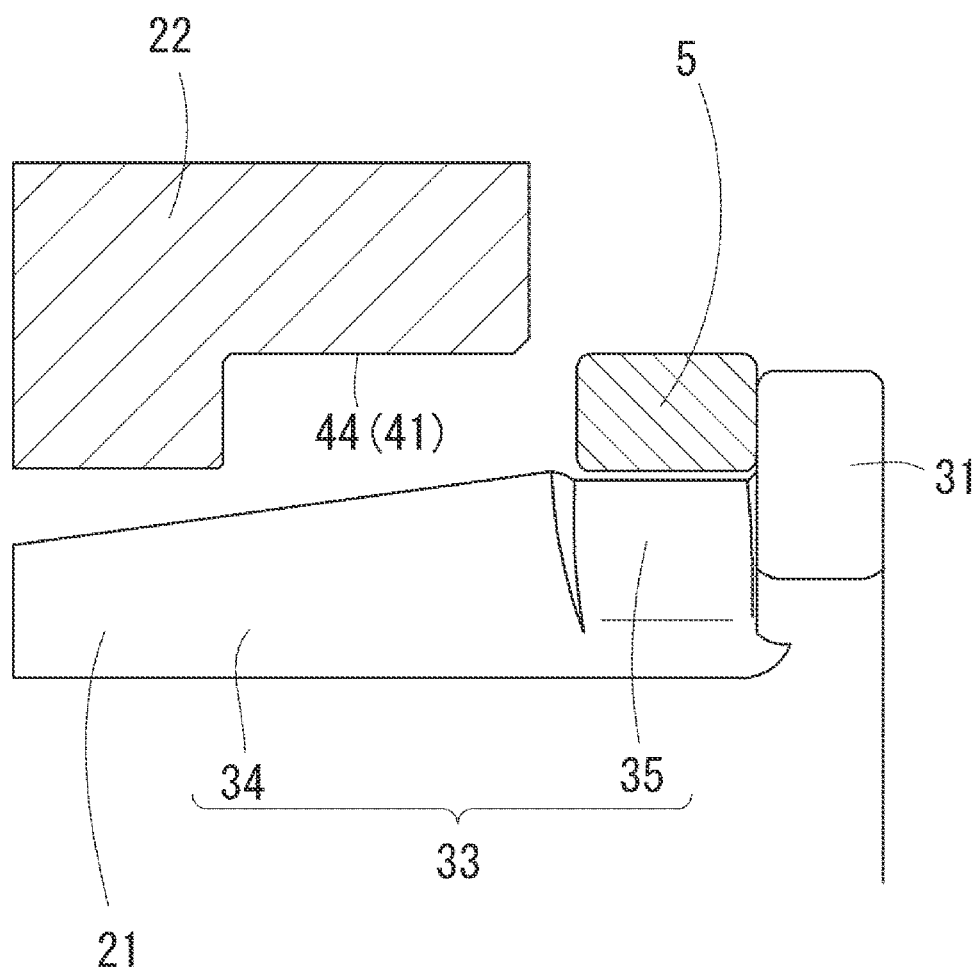
FIG. 16 is a side view of a section of a part of the coil forming device.

FIG. 16 illustrates a state where the upper die 22 is rotated in the clockwise direction in order to take the coil 2 out of the coil forming device 20. As described above, when the bus bar 5 reaches the escape region 35, the contact resistance between the bus bar 5 and the upper-die machining surface 41 is slightly decreased. Accordingly, when the upper die 22 is rotated in the clockwise direction, the Z-shaped bus bar 5 is effectively restrained from deforming in the clockwise direction along with the movement of the upper-die machining surface 41.

Figure 17:
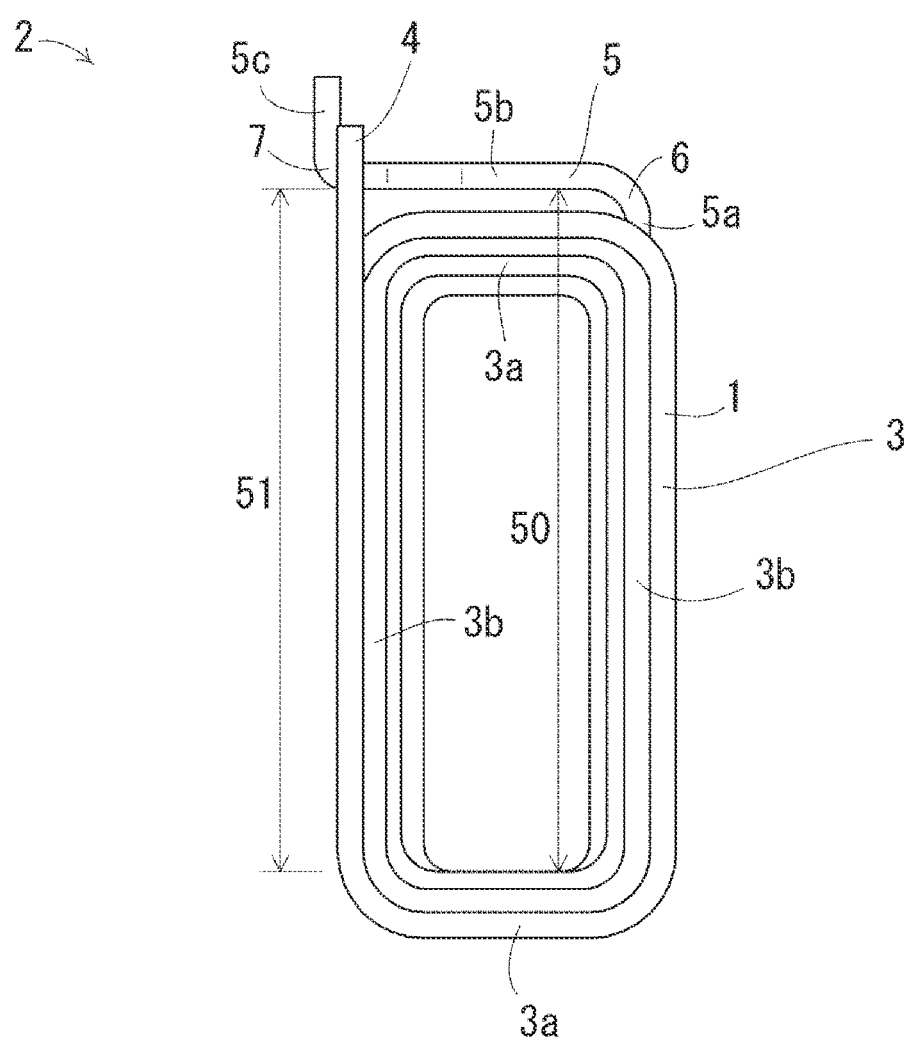
FIG. 17 is a plan view of the coil.

FIG. 17 is a plan view of the coil 2. As described above, in a later step, the distal end 5c of the Z-shaped bus bar 5 is welded to the linear bus bar 4 of another coil 2. Accordingly, positional accuracy of the distal end 5c of the Z-shaped bus bar 5 is defined extremely strictly. In FIG. 17, a distance 50 is a distance between the short side portion 3a, out of two short side portions 3a, that is distant from the Z-shaped bus bar 5 and a part, of the flexural extension portion 5b, that is close to the base-side edgewise bending portion 6. A distance 51 is a distance between the short side portion 3a, out of the two short side portions 3a, that is distant from the Z-shaped bus bar 5 and a part, of the flexural extension portion 5b, that is close to the distal-side edgewise bending portion 7. As described above, as one index to manage the positional accuracy of the distal end 5c, the distance 50 and the distance 51 are regarded as important. In the present embodiment, clockwise deformation of the Z-shaped bus bar 5 is effectively restrained at the time when the upper die 22 is rotated in order to take the coil 2 out of the coil forming device 20, so that positional accuracy of the distance 50 and the distance 51 can easily fall within a predetermined allowable range.

A preferred embodiment of the disclosure has been described above, but the above embodiment has the following features.

That is, as illustrated in FIG. 3, the coil forming device 20 performs flatwise bending on the bus bar 5 (a flat-square conductive material end) as the end of the flat-square conductive material 1 constituting the coil 2. The coil forming device 20 includes the upper die 22 (the first die) and the lower die 21 (the second die) independently rotatable around the rotation axis C (a first rotation axis). The upper die 22 includes the upper-die machining surface 41 (a first machining surface). The lower die 21 includes the lower-die machining surface 30 (the second machining surface). For example, as illustrated in FIG. 10, the upper-die machining surface 41 and the lower-die machining surface 30 are placed so as to face each other across the bus bar 5 in the vertical direction (the axis direction of the rotation axis C). For example, as illustrated in FIG. 7, the recess portion 44 is formed on the upper-die machining surface 41 such that the recess portion 44 is recessed so as to be distanced from the lower-die machining surface 30 in the state where the upper-die machining surface 41 and the lower-die machining surface 30 face each other. Further, as illustrated in FIG. 4, for example, the protrusion portion 33 is formed on the lower-die machining surface 30 such that the protrusion portion 33 protrudes in a projection shape toward the recess portion 44 in the state where the upper-die machining surface 41 and the lower-die machining surface 30 face each other. The edge line 33R of the protrusion portion 33 is formed so as to extend in an arc shape around the rotation axis C. The protrusion portion 33 includes the inclined region 34 and the escape region 35 adjacent to each other in the rotation direction of the lower die 21. The inclined region 34 and the escape region 35 are placed such that, when the lower die 21 is rotated relative to the upper die 22 in the clockwise direction (the first rotation direction), the inclined region 34 first faces the recess portion 44 in the vertical direction (the axis direction), and then, the escape region 35 faces the recess portion 44 in the vertical direction, as illustrated in FIGS. 11 to 13. As illustrated in FIG. 11, the edge line 33R in the inclined region 34 is inclined so that a clearance between the edge line 33R in the inclined region 34 and the recess portion 44 in the vertical direction is gradually decreased as the lower die 21 is rotated relative to the upper die 22 in the clockwise direction. The edge line 33R in the escape region 35 is formed so that a clearance (the distance 71) between the edge line 33R in the escape region 35 and the recess portion 44 in the vertical direction is larger than a minimum clearance (the distance 70) between the edge line 33R in the inclined region 34 and the recess portion 44 in the vertical direction. As illustrated in FIGS. 9 to 13, when the lower die 21 is rotated relative to the upper die 22 in the clockwise direction in the state where the bus bar 5 is placed between the upper-die machining surface 41 and the lower-die machining surface 30 so that two flat surfaces of the bus bar 5 face the upper-die machining surface 41 and the lower-die machining surface 30, respectively, the bus bar 5 is bent in flatwise bending by the recess portion 44 and the inclined region 34 of the protrusion portion 33, and after that, the bus bar 5 reaches the escape region 35. With the above configuration, when the bus bar 5 moves over the inclined region 34 and reaches the escape region 35, the contact resistance between the bus bar 5 and the upper-die machining surface 41 is slightly decreased. Accordingly, in order to take the coil 2 out of the coil forming device 20, when the upper die 22 is rotated relative to the lower die 21 in the clockwise direction in the state where the bus bar 5 has reached the escape region 35, the bus bar 5 can be hardly pulled by the upper die 22 in the clockwise direction. Thus, high positional accuracy of the bus bar 5 is achieved.

Further, as illustrated in FIG. 11, the width 35W of the escape region 35 is larger than the width 5W of the bus bar 5. With the above configuration, when the bus bar 5 moves over the inclined region 34 and reaches the escape region 35, the contact resistance between the bus bar 5 and the upper-die machining surface 41 is surely decreased. The width 35W of the escape region 35 is a length of the escape region 35 (the groove) in the lateral direction in FIG. 11. That is to say, the width 35W of the escape region 35 is a width of the escape region 35 (the groove) in a sectional view perpendicular to the longitudinal direction of the rib 31.

Further, the upper die 22 includes the upper-die restriction surface 42 (a first restriction surface) configured to restrict the bus bar 5 from moving relative to the upper die 22 in the clockwise direction, by making contact with the first edge surface of the bus bar 5 in the state where the bus bar 5 is placed between the upper-die machining surface 41 and the lower-die machining surface 30 so that two flat surfaces of the bus bar 5 face the upper-die machining surface 41 and the lower-die machining surface 30, respectively. With the above configuration, when the lower die 21 is rotated relative to the upper die 22 in the clockwise direction so that the bus bar 5 is bent in flatwise bending, it is possible to restrain the bus bar 5 from deforming by being pulled by the lower die 21 in the clockwise direction.

Further, the lower die 21 includes the lower-die restriction surface 31*a* (a second restriction surface) that can come into contact with the second edge surface of the bus bar 5 on the opposite side from the first edge surface when the bus bar 5 moves over the inclined region 34 and reaches the escape region 35. In the above configuration, when a base of the bus bar 5 is bent in edgewise bending by simultaneously rotating the upper die 22 and the lower die 21 in the counterclockwise direction reverse to the clockwise direction in the state where the bus bar 5 is sandwiched between the upper-die machining surface 41 and the lower-die machining surface 30, edgewise bending is performed in the state where the bus bar 5 is sandwiched between the upper-die restriction surface 42 and the lower-die restriction surface 31*a*, thereby making it possible to restrain unintentional deformation of the bus bar 5.

Further, a difference between the clearance (the distance 71) between the edge line 33R in the escape region 35 and the recess portion 44 in the vertical direction and the minimum clearance (the distance 70) between the edge line 33R in the inclined region 34 and the recess portion 44 in the vertical direction is from 0.05 mm to 0.1 mm. With the above configuration, it is possible to effectively restrain the contact resistance and to secure the positional accuracy of the Z-shaped bus bar 5 in the vertical direction at the same time.

What is claimed is:

1. A coil forming device configured to perform flatwise bending on a flat-square conductive material end as an end of a flat-square conductive material constituting a coil, the coil forming device comprising:
    a first die configured to independently rotate around a first rotation axis, the first die including a first machining surface; and
    a second die configured to independently rotate around the first rotation axis, the second die including a second machining surface,
        the first machining surface and the second machining surface being configured to be placed so as to face each other across the flat-square conductive material end in an axis direction of the first rotation axis;
        the first machining surface including a recess portion recessed so as to be distanced from the second machining surface when the first machining surface and the second machining surface face each other,
        the second machining surface including a protrusion portion protruding toward the recess portion when the first machining surface and the second machining surface face each other,
        an edge line of the protrusion portion extends in an arc shape around the axis direction of the first rotation axis,
        the protrusion portion including an inclined region and an escape region adjacent to each other in a rotation direction of the second die,
        the inclined region and the escape region being placed such that, when the second die is rotated relative to the first die in a first rotation direction, the inclined region first faces the recess portion in the axis direction of the first rotation axis, and then, the escape region faces the recess portion in the axis direction of the first rotation axis,
        the edge line in the inclined region being inclined so that a clearance between the edge line in the inclined region and the recess portion in the axis direction of the first rotation axis is gradually decreased as the second die is rotated relative to the first die in the first rotation direction,
        the edge line in the escape region being formed so that a clearance between the edge line in the escape region and the recess portion in the axis direction of the first rotation axis is larger than a minimum clearance between the edge line in the inclined region and the recess portion in the axis direction of the first rotation axis; and
        when the second die is rotated relative to the first die in the first rotation direction in a state where the flat-square conductive material end is placed between the first machining surface and the second machining surface so that two flat surfaces of the flat-square conductive material end face the first machining surface and the second machining surface respectively, the flat-square conductive material end being bent in flatwise bending by the recess portion and the inclined region of the protrusion portion, and then, the flat-square conductive material end being placed in the escape region.

2. The coil forming device according to claim 1, wherein a width of the escape region is larger than a width of the flat-square conductive material end.

3. The coil forming device according to claim 1, wherein the first die includes a first restriction surface,
    the first restriction surface is configured to restrict the flat-square conductive material end from moving relative to the first die in the first rotation direction by coming into contact with a first edge surface of the flat-square conductive material end, when the flat-square conductive material end is placed between the first machining surface and the second machining surface so that the two flat surfaces of the flat-square conductive material end face the first machining surface and the second machining surface, respectively.

4. The coil forming device according to claim 3, wherein the second die includes a second restriction surface,
    the second restriction surface is configured to come into contact with a second edge surface of the flat-square conductive material end when the flat-square conductive material end moves over the inclined region and reaches the escape region, the second edge surface being on an opposite side from the first edge surface of the flat-square conductive material end.

5. The coil forming device according to claim 1, wherein a difference between the clearance between the edge line in the escape region and the recess portion in the axis direction and the minimum clearance between the edge line in the inclined region and the recess portion in the axis direction is from 0.05 mm to 0.1 mm.

* * * * *

UNITED STATES PATENT AND TRADEMARK OFFICE
CERTIFICATE OF CORRECTION

PATENT NO. : 11,283,333 B2
APPLICATION NO. : 16/160105
DATED : March 22, 2022
INVENTOR(S) : Hiromitsu Kuraoka and Toshiaki Takahashi It is certified that error appears in the above-identified patent and that said Letters Patent is hereby corrected as shown below:

On the Title Page

Item (73) Assignee; Please delete "TOYOTA JTDOSHA KABUSHIKI KATSHA, Toyota (JP)" and insert -- TOYOTA JIDOSHA KABUSHIKI KAISHA, Toyota (JP) --

Signed and Sealed this
Second Day of August, 2022

Katherine Kelly Vidal
*Director of the United States Patent and Trademark Office*